United States Patent [19]

Harris

[11] Patent Number: 4,877,146

[45] Date of Patent: Oct. 31, 1989

[54] VACUUM-CONTROLLED VAPOR RECOVERY SYSTEM

[75] Inventor: Robert S. Harris, Connersville, Ind.

[73] Assignee: Stant Inc., Connersville, Ind.

[21] Appl. No.: 328,287

[22] Filed: Mar. 24, 1989

Related U.S. Application Data

[63] Continuation-in-part of Ser. No. 148,384, Jan. 25, 1988, which is a continuation-in-part of Ser. No. 106,632, Oct. 8, 1987, Pat. No. 4,816,045, which is a continuation-in-part of Ser. No. 846,081, Mar. 31, 1986, Pat. No. 4,770,677.

[51] Int. Cl.[4] ............................................. B65D 6/12
[52] U.S. Cl. ................................. 220/85 VR; 55/88; 55/182; 141/286; 141/44; 220/86 R
[58] Field of Search ................. 55/88, 165, 168, 182, 55/387; 141/44, 45, 286, 302; 220/85 VR, 86 R

[56] References Cited

U.S. PATENT DOCUMENTS

| | | | |
|---|---|---|---|
| 3,289,711 | 12/1966 | Hall | 141/286 |
| 3,543,484 | 12/1970 | Davis | 55/387 |
| 3,643,690 | 2/1972 | Sarai | 137/587 |
| 3,752,135 | 8/1973 | Peterson et al. | 123/136 |
| 3,763,901 | 10/1973 | Viland | 141/8 |
| 3,854,911 | 12/1974 | Walker | 55/387 |
| 3,884,204 | 5/1975 | Krautwurst et al. | 123/136 |
| 3,907,010 | 9/1975 | Burtis et al. | 141/45 |
| 3,907,153 | 9/1975 | Mutty | 220/86 |
| 3,921,412 | 11/1975 | Heath et al. | 62/54 |
| 4,142,647 | 3/1979 | Walters | 220/85.8 |
| 4,384,962 | 5/1983 | Harris | 210/788 |
| 4,420,392 | 12/1983 | Harris | 210/86 |
| 4,497,714 | 2/1985 | Harris | 210/788 |
| 4,610,284 | 9/1986 | Bartholomew | 141/302 |
| 4,630,749 | 12/1986 | Armstrong et al. | 220/86 |
| 4,651,889 | 3/1987 | Uranishi et al. | 220/85 |
| 4,699,638 | 10/1987 | Harris | 55/168 |
| 4,701,198 | 10/1987 | Uranishi et al. | 55/387 |
| 4,795,050 | 1/1989 | Smith | 220/85 VR |
| 4,813,453 | 3/1989 | Jenkins et al. | 220/85 VR |

Primary Examiner—Charles Hart
Attorney, Agent, or Firm—Barnes & Thornburg

[57] ABSTRACT

A recovery system is provided for recovering fuel vapor normally discharged from a fuel system during refueling. The recovery system includes a fuel tank filler neck, a vent system coupled to the filler neck, and a double-sealed cap for actuating the vent system as it is removed from the neck. The neck has a mouth and axially spaced-apart upper and lower side outlets. The double-sealed cap includes a closure rotatably engaging the neck, a first seal for establishing a movable primary seal between the closure and axially outer side wall of the neck and a second seal for establishing a movable secondary seal between the closure and at least an axially inner side wall of the neck. The primary and secondary seals move in an axially outward direction relative to the neck in response to removal of the cap, causing the primary and secondary seals to be broken in sequence as the cap is rotated. The vent system vents pressurized fuel vapor from the neck through the lower side outlet in response to rotation of the cap in its cap-removal direction to a position wherein only the primary seal is broken. Thus, pressurized fuel vapor is discharged to a canister through the lower side outlet of the neck without being exhausted to the atmosphere through the filler neck mouth.

16 Claims, 5 Drawing Sheets

VACUUM-CONTROLLED VAPOR RECOVERY SYSTEM

BACKGROUND AND SUMMARY OF THE INVENTION

This is a continuation-in-part of co-pending Pat. Application Ser. No. 07/148,384, filed Jan. 25, 1988, which is a continuation-in-part of application Ser. No. 07/106,632, filed Oct. 8, 1987, and now U.S. Pat. No. 4,816,045, issued Mar. 28, 1989, which is a continuation-in-part of application Ser. No. 06/846,081, filed Mar. 31, 1986, now U.S. Pat. No. 4,770,677, issued Sept. 13, 1988 and assigned to the same assignee as the present application.

This invention relates to vehicle emissions control, and particularly to a recovery system for recovering fuel vapor normally discharged from a fuel system during refueling. More particularly, this invention relates to a vacuum-controlled system for actuating a vent valve in a fuel system filler neck during removal of a fuel cap from the filler neck to exhaust pressurized fuel vapor from the filler neck to a fuel vapor treatment site without exhausting pressurized fuel vapor through the filler neck mouth to the atmosphere.

Polluting emissions are released into the atmosphere during each and every motor vehicle refueling activity. Typically, removal of a fuel cap permits pressurized fuel vapors present within the vehicle fuel system to escape to the atmosphere. In view of the frequency of vehicle refueling activities, it will be appreciated that a significant quantity of otherwise combustible fuel is lost to the atmosphere each time a vehicle is refueled.

New fuel vapors are generated during refueling due to splash and agitation of the dispensed fuel, as well as from potential temperature differences between the fuel tank and the dispensed fuel. In addition, as the liquid fuel dispensed at the pump fills the vehicle fuel tank, fuel vapors that are present in the tank and generated during refueling are displaced by liquid fuel. These displaced fuel vapors are moved out of the fuel tank vapor space by the displacing action of the liquid fuel. In conventional vehicle fuel systems, these displaced vapors are released directly into the atmosphere via the fuel tank filler neck and are a contributing factor to air pollution.

One object of the present invention is to provide an emissions control system for advantageously capturing fuel vapors normally discharged during a vehicle refueling activity so as to reduce waste to fuel energy resources, assist in reducing the level of air pollution, and avoid the shortcomings of conventional fuel systems.

Another object of the present invention is to provide a fuel vapor recovery system that conforms to all government environmental and safety regulations regarding evaporated and refueling emissions, exhaust emissions, and vehicle impact, and it also satisfies customer-perceived vehicle functions such as driveability, ease of refueling, and control of fuel vapor odor.

Yet another object of the present invention is to provide a two-stage fuel cap for actuating a vacuum-controlled fuel vapor recovery system in a vehicle during an initial stage of each vehicle refueling activity.

Another object of the present invention is to provide a double-sealed fuel cap for actuating a vacuum-controlled fuel vapor venting assembly coupled to the fuel system filler neck during removal of the fuel cap from the filler neck yet prior to breaking the fuel and fuel vapor seal existing therebetween, thereby preventing discharge of pressurized fuel vapor through the mouth of the filler neck during recovery of the fuel vapor exhausted by the venting assembly.

Yet another object of the present invention is to provide a fuel cap that activates a vacuum-controlled fuel vapor vent valve in the filler neck during a first stage of fuel cap movement relative to the filler neck in a cap-removal direction.

Still another object of the present invention is to provide a fuel cap having a pair of separate, spaced-apart filler neck-engaging seals that are movable relative to the filler neck during cap removal to permit atmosphere to enter a distal portion of the filler neck communicating with a vacuum-controlled fuel vapor vent valve, thereby actuating he vent valve to recover pressurized fuel vapor from the filler neck without exhausting untreated fuel vapor to the atmosphere through the mouth of the filler neck.

In accordance with the present invention, a recovery system is provided for recovering fuel vapor normally discharged from a fuel system during refueling. The recovery system includes a fuel tank filler neck having a mouth and a vent outlet spaced in relation to the mouth and a fuel cap including closure means rotatably engaging the filler neck for closing the mouth. The closure means includes first seal means for normally establishing a seal between the closure means and the filler neck.

The recovery system further includes vent means for selectively venting pressurized fuel vapor from the filler neck through the vent outlet and actuation means for actuating the vent means during rotation of the cap relative to the filler neck and prior to removal of the cap from the filler neck. The vent means is selectively actuated to vent pressurized fuel vapor in the filler neck through the vent outlet without venting pressurized fuel vapor through the filler neck mouth.

In peferred embodiments, the filler neck is also formed to include an air suction outlet situated between the mouth and the vent outlet. The actuation means further includes second seal means for normally establishing a seal between the closure means and the filler neck. Illustratively, the first and second seal means are situated in axially spaced-apart relation and installed in radially outwardly opening annular recesses formed in the closure means.

The vent means includes a valve housing containing a vacuum-controlled valve. The valve is movable in the housing between vent outlet-opening and vent outlet-closing positions. Bias means is provided for yieldably moving the valve to its vent outlet-opening position in the absence of a vacuum in the valve housing. In addition, passageway means is provided for coupling the air suction outlet formed in the filler neck and the valve housing in fluid communication.

The actuation means further includes vacuum means for applying a vacuum to the valve housing so that the vacuum-controlled valve is normally retained in its vent-closing position. In such a position, the valve acts to block the flow of pressurized fuel vapor from the sealed filler neck to a canister or other fuel vapor treatment site through the vent means. As long as the cap is tightened on the filler neck, both of the first and second seal means will act to retain pressurized fuel vapor in the filler neck.

In operation, atmosphere is introduced through the filler neck mouth into the air suction outlet formed in the filler neck upon rotation of the fuel cap relative to the filler neck to a position breaking the first seal. Due to the presence of a vacuum in the valve housing, the atmosphere introduced into the air suction outlet is drawn into the valve housing through the passageway means interconnecting the air suction outlet and the valve housing. This atmosphere acts to dissipate the vacuum existing in the valve housing which causes the bias means to move the vacuum-controlled valve to its vent outlet-opening position. At this stage, pressurized fuel vapor is not permitted to escape from the filler neck through the filler neck mouth since the fuel vapor seal established by the second seal means has not been broken due to rotation of the fuel cap relative to the filler neck. However, such pressurized fuel vapor is discharged from the filler neck through the now open vent outlet and conducted toward a fuel vapor treatment site such as a canister or the like.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
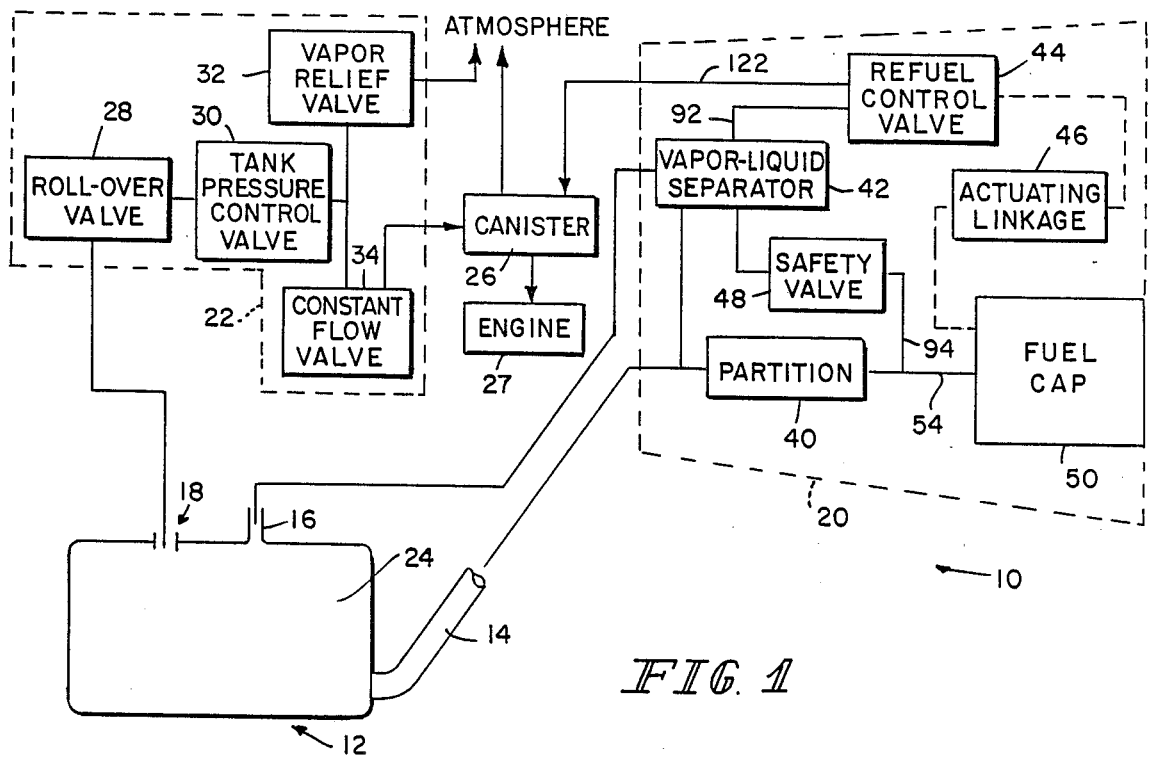
FIG. 1 is a block diagram of a system for recovering vapors during a vehicle refueling activity in accordance with the present invention.

Referring to FIG. 1, one preferred embodiment of a vapor recovery system 10 includes a fuel tank 12 having a filler neck 14, a fill-limiting vent tube 16, and a vent valve opening 18, a vapor recovery module 20, and a roll-over valve module 22. The vapor recovery module 20 is automatically actuated in the manner explained below to conduct substantially all fuel vapors that are present in the vapor space 24 of the fuel tank 12, displaced by liquid fuel during refueling, and generated during refueling, to a fuel vapor treatment site 26 for environmental treatment therein. Preferably, a conventional charcoal canister or other vapor condenser is provided at treatment site 26 to adsorb liquid fuel entrained in the recovered fuel vapors onto a substrate to permit recombustion in vehicle engine 27 at a later time.

In the embodiment of FIG. 1, the roll-over valve module 22 includes a roll-over valve 28, a tank-pressure control valve 30, a vapor-relief valve 32, and a constant flow valve 34. The roll-over valve module 22 is preferably mounted in a wall of the fuel tank 22 at vent valve opening 18. The roll-over valve module 22 serves a dual purpose by selectively releasing fuel vapors from the vapor space 24 to either the canister 26 or the atmosphere so as to regulate flow of fuel vapors to the canister 26, and by automatically closing the vent valve opening 18 during a vehicle rollover accident so as to guard against hazardous fuel leakage. Reference is hereby made to U.S. Pat. No. 4,655,238 for a complete disclosure of a roll-over valve assembly suitable for use in the vapor recovery system 10.

As shown in block diagram form in FIG. 1, the vapor recovery module 20 includes a partition 40 in the filler neck 14, a vapor-liquid separator 42, a refuel control valve 44, an actuating linkage 46, a safety valve 48, and a fuel cap 50. Illustratively, the actuating linkage 46 provides means for sensing whenever the fuel cap 50 is loosened a sufficient amount during an initial stage of each refueling activity. The actuating linkage 46 also provides means for actuating the refuel control valve 44 in response to the sensing means. Actuation of refuel control valve 44 permits fuel vapors present in the vapor space 24, and otherwise associated with refueling, to be conducted to the canister 26 via a vapor flow path in the vapor recovery module 20 instead of allowing such environmentally damaging vapor to escape untreated to the atmosphere through filler neck outlet 54. FIGS. 3-6 illustrate one preferred arrangement of he components illustrated in block diagram form in FIG. 1.

Figure 6:
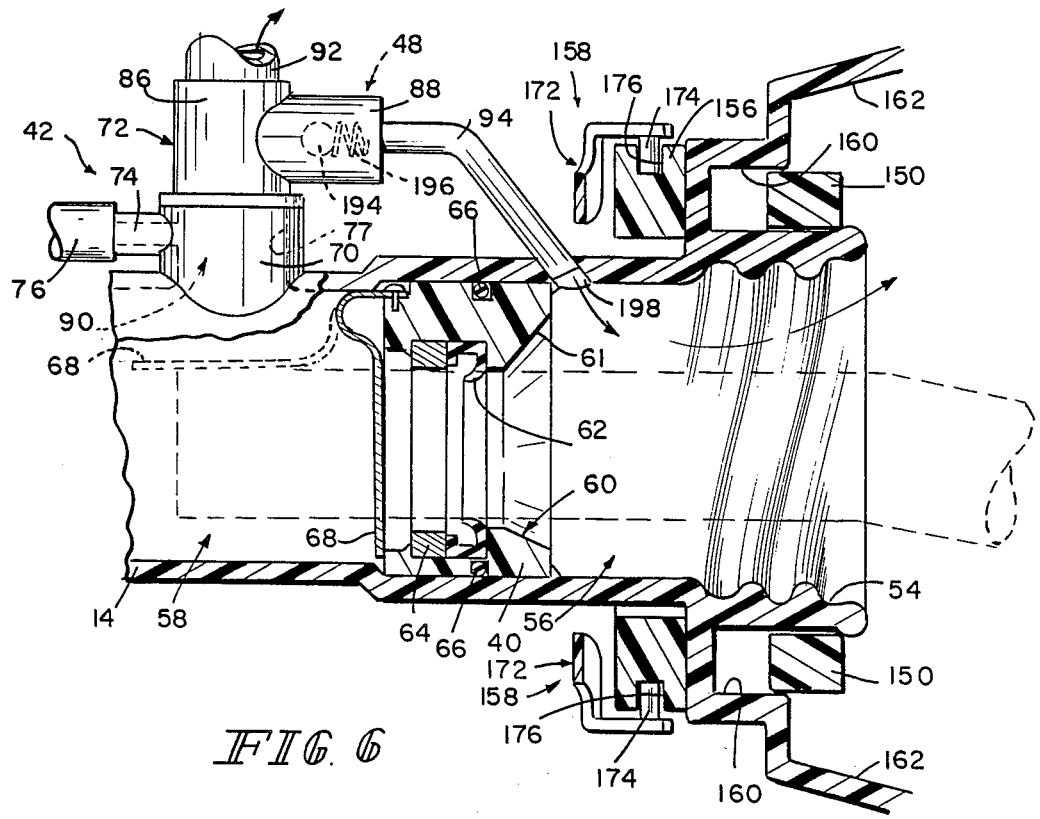
FIG. 6 is a longitudinal sectional view taken along lines 6—6 of FIG. 3 showing a fuel-dispensing nozzle in phantom lines inserted into the fuel tank filler neck during refueling.

Referring primarily to FIGS. 1 and 6, partition 40 is staked in place in the filler neck 14 in proximity to the filler neck mouth 54 to separate filler neck 14 into an outer chamber 56 and an inner chamber 58. The outer chamber 56 is communicable with the atmosphere via filler neck mouth 54 whenever the fuel cap 50 is removed. The inner chamber 58 is always in fluid communication with the fuel tank 12 via the filler neck 14. Advantageously, partition 40 provides a vapor tight inner chamber 58 so as to prevent escape of untreated fuel vapors to the atmosphere during refueling.

At service, partition 40 may be easily detached for repair or disposal. As shown in FIG. 6, the inner diameter of outer chamber 56 is stepped to permit removal of the partition 40 therethrough. One advantage of the present invention is that partition 40 is replaceable as a unit for service through the outer chamber 56 and filler neck mouth 54 without disassembly of the vapor recovery module 20 from its installed position in a vehicle. After service, a repaired or replacement partition may be staked into a proper position within filler neck 14.

Partition 40 includes a nozzle size-restricting passageway 60 for admitting a pump nozzle (represented by broken lines in FIG. 6) into the inner chamber 58. An annular nozzle seal 62 sealingly embraces the pump nozzle during pumping as shown in FIG. 6. Annular nozzle seal 62 is held in sealing position in the passageway 60 by retainer 64 so that fuel can be dispensed into the inner chamber 58 without coupling the inner and outer chambers 58, 56 in fluid communication during refueling. Hard nozzle pilot surface 61 is provided in passageway 60 to protect seal 62 from damage during refueling. An O-ring seal 66 is situated in a recess formed in an exterior wall of partition 40 to engage an interior wall of passageway 60 in sealing relation. Leaded fuel splash door 68 is pivotally mounted or otherwise deflectable in relation to an inner end of partition 40 in a customary way to splash leaded fuel dispensed using an ordinary pump nozzle back toward a user.

Vapor-liquid separator 42 is used for separating liquid fuel entrained in fuel vapor discharged from fuel tank 12 via a fill-limiting tube 16 and/or a filler neck 14 to reduce the mass of fuel entrained in such discharged vapor prior to introducing the vapor into canister 26. As shown best in FIG. 3, the separator 42 includes a hollow base 70 fixed to an exterior surface of filler neck 14 and a top cover assembly 72.

Figure 3:
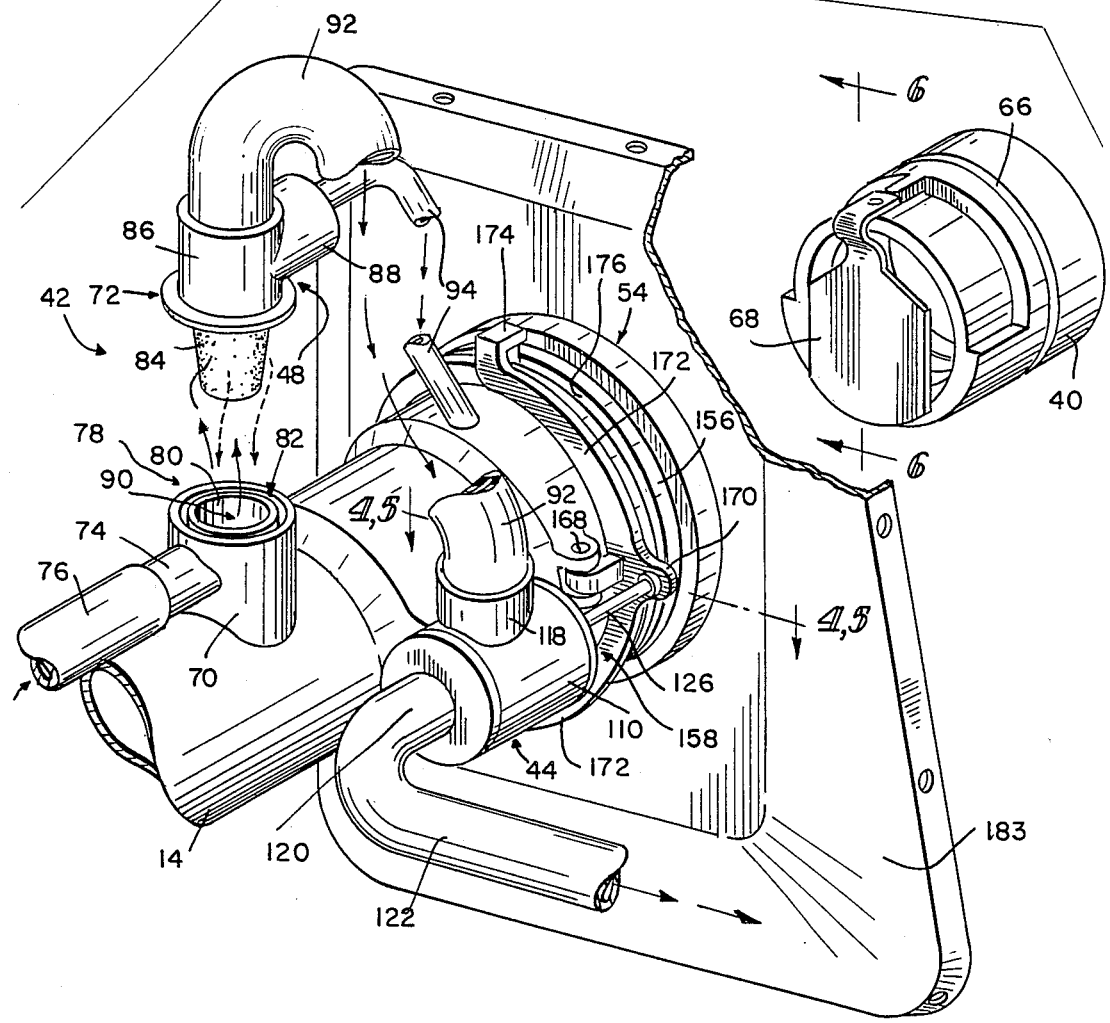
FIG. 3 is an exploded perspective view of a preferred embodiment of a vapor recovery module in accordance with the present invention with portions broken away.

Referring to FIGS. 3 and 6, base 70 includes an inlet 74 in fluid communication with the fill-limiting vent tube 16 via pipe 76, a liquid fuel outlet 77, and an upper opening 78 coverable by top cover assembly 72. Annular shield 80 is installed in the chamber provided by hollow base 70 in spaced relation to define an annular swirl passage 82 therebetween. The top cover assembly 72 includes a discriminator screen 84, a fuel vapor outlet 86, and a pressure-relief outlet 88. The discriminator screen 84 depends therefrom so that it is suspended in an interior space 90 of annular shield 80 when the top cover assembly 72 is mounted on the hollow base 70.

In use, fuel vapor introduced into separator 42 is swirled through swirl passage 82 causing liquid fuel (represented by broken line arrows in FIGS. 3 and 6) entrained in the fuel vapor to move downwardly toward the liquid fuel outlet 77 while the remaining lower density fuel vapor (represented by solid line arrows in FIGS. 3, 5, and 6) moves upwardly toward the fuel vapor outlet 86. The discriminator screen 84 intercepts the swirling fuel vapor so that some of the liquid fuel entrained in the vapor coalesces or otherwise agglomerates thereon to form liquid fuel droplets that once formed fall under gravity toward liquid fuel outlet 77. Fuel vapor outlet 86 is coupled to refuel control valve 44 by pipe 92 and pressure-relief outlet 88 is coupled directly to safety valve 48. In addition, liquid fuel outlet 77 is coupled to inner chamber 58 of the filler neck 14 to provide means for recovering separated liquid fuel by recirculation of same to the fuel tank 12 via filler neck 14.

Figure 4:
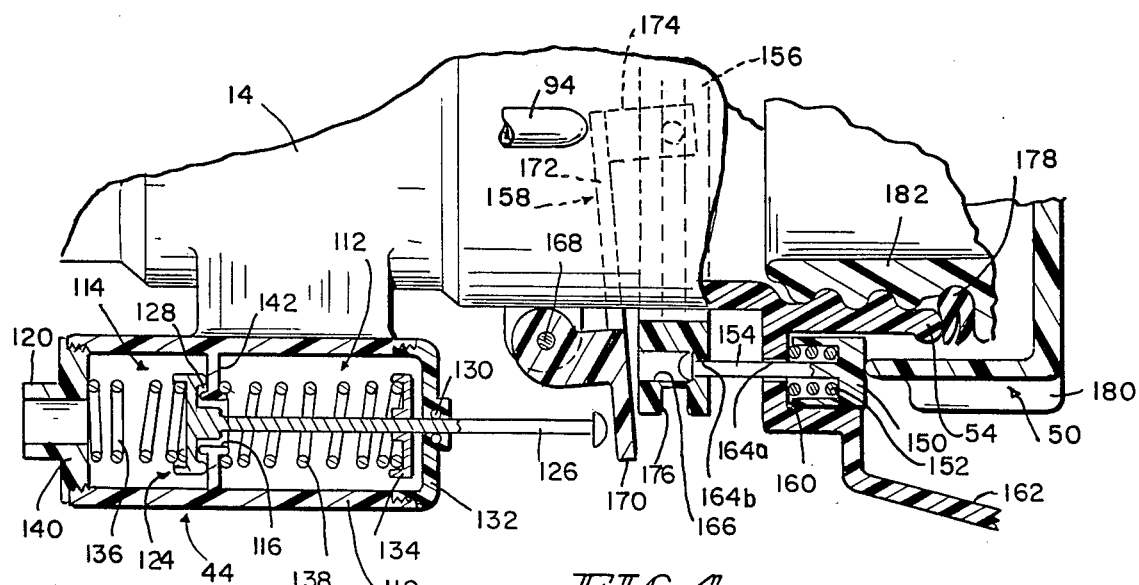
FIG. 4 is a longitudinal sectional view taken along lines 4—4 of FIG. 3 showing a fuel cap mounted on a fuel tank filler neck in a fully tightened position during normal non-refueling activities.
Figure 5:
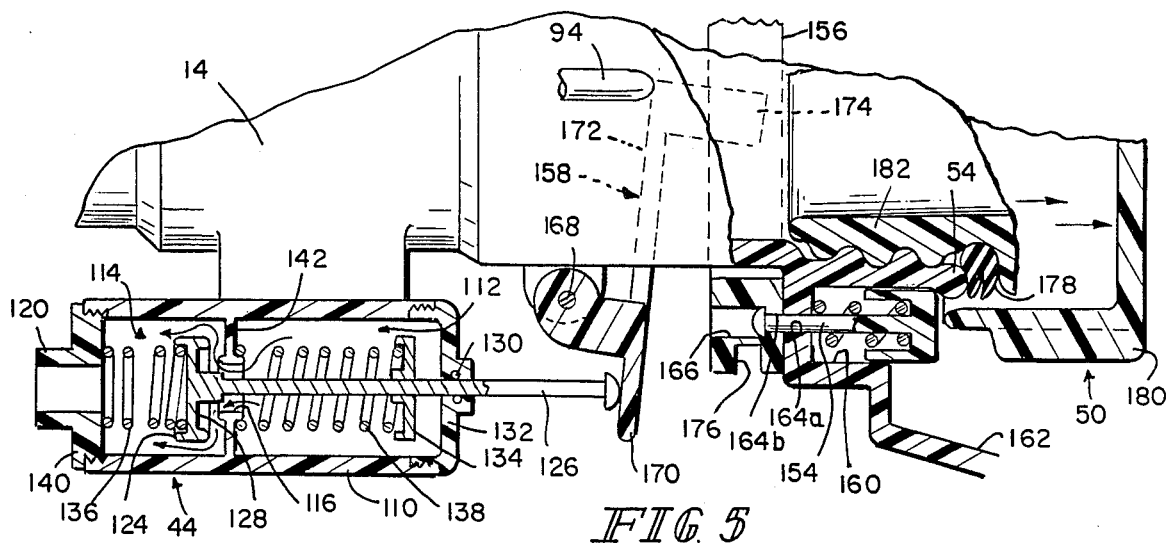
FIG. 5 is a view similar to the view in FIG. 4 showing the fuel cap in a slightly loosened position during an initial stage of fuel vapor recovery.

Refuel control valve 44 regulates the flow of fuel vapor discharged from separator 42 to the canister 26 so that such flow is permitted only during vehicle refueling activity. Referring to FIGS. 4 and 5, the refuel control valve 44 includes a valve housing 110 providing downstream chamber 112 coupled in fluid communication to an upstream chamber 114 by central aperture 116. As shown best in FIG. 3, the refuel control valve 44 also includes a fuel vapor inlet 118 coupled to the fuel vapor outlet 86 of separator 42 via pipe 92 and fuel vapor outlet 120 coupled to canister 24 via pipe 122.

A primary valve head 124 is provided in upstream chamber 114 for closing central aperture 116 during all period of non-refueling activity to prevent unwanted distribution of fuel vapor from separator 42 to the canister 26. Valve stem 126 extends in substantially spaced-apart parallel relation to filler neck 14 from a downstream face 128 of valve head 124 through a bearing support 130 provided in end wall 132 of valve housing 110 toward the filler neck mouth 54. A secondary valve head 134 is provided in downstream chamber 112 and rigidly attached to valve stem 126 for movement therewith.

The primary valve head 124 is normally loaded to its shut-off position closing aperture 116 by each of biasing springs 136, 138 as shown best in FIG. 4. Primary biasing spring 136 acts between fixed end wall 140 and movable primary valve head 124 while secondary biasing spring 138 acts between fixed central wall 142 and movable secondary valve head 134. It will be appreciated that such a dual-spring arrangement advantageously ensures substantially fail-safe operation of refueling control valve 44 in that the primary valve head 124 will remain in its normally closed shut-off position even if one of springs 136, 138 should fail.

Actuating linkage 46 provides one preferred means for actuating the refueling control valve 44 during a predetermined initial stage of each refueling activity. In the illustrated embodiment, a mechanical spring-biased linkage is provided for sensing when fuel cap 50 is loosened from its mounted position on the filler neck 14, which loosening is indicative of the beginning of a refueling activity cycle, and for then moving the primary valve head 124 in opposition to biasing springs 136, 138 to an aperture (116)-opening position. Once aperture 116 is opened, fuel vapors can flow therethrough from the vapor-liquid separator 42 to the canister 26 during refueling. It will be appreciated that various hydraulic, pneumatic, electrical, and mechanical sensory switching systems could form analogs of the preferred mechanical actuating linkage 46 illustrated in FIGS. 3-6 without departing from the present invention.

One important feature of the present invention is that the vapor recovery module 20 is activated automatically or at least remotely controlled to recover fuel vapor for later recombustion whenever the vehicle is ready for refueling. It is within the scope of the present invention to actuate said linkage means by a manner other than loosening of a fuel cap. For example, actuating linkage 46 could be coupled to a fuel door, fuel pump nozzle, control button, or other similar member to permit a refueling attendant to actuate the refueling control valve 44 in a variety of different ways at a preferred moment during each refueling activity cycle.

Referring to FIGS. 3-6, actuating linkage 46 includes an annular control pad 150, pad-biasing springs 152, control rods 154, control ring 156, and pivoting yoke lever 158. As shown best in FIGS. 4–6, control pad 150 is positioned in outwardly facing annular groove 160 formed in refueling cavity wall 162 in a region surrounding the mouth 54 of the filler neck 14. A plurality of control rods 154 extend from control pad 150 through companion rod-receiving apertures 164a,b formed in the refueling cavity wall 162 and control ring 156, respectively, into engagement with annular groove 166 formed in control ring 156 as seen in FIGS. 4 and 5. A pad-biasing spring 152 surrounds each control rod 154 to bias the control pad 150 normally from the inactive position shown in FIG. 4 to the valve-actuating position shown in FIG. 5. Although spring 152 is shown in annular groove 160 in FIGS. 4 and 5, it is expected that such a spring could alternatively be positioned elsewhere, e.g., in contact with control ring 156. Yoke lever 158 is mounted for pivotal movement about a vertical pivot axis at pivot 168. In the illustrated embodiment best seen in FIGS. 1, 4, and 5, yoke lever 158 includes a central lever arm 170 for contacting a distal end of valve stem 126 and a pair of oppositely-extending outstretched lever arms 172 for engaging the control ring 156. In particular, as best seen in FIG. 6, projections 174 on lever arms 172 engage a radially outwardly facing channel 176 formed on an outer edge of control ring 156 to interconnect lever arms 172 and control ring 156.

The safety valve 48 is illustrated in FIGS. 1, 3, and 5 and includes a normally closed poppet valve 194 and biasing means 196 for yieldably biasing the poppet valve 194 from an open venting position (not shown) to its normally closed position. The poppet valve 194 is moved against the yieldable biasing means 196 whenever the pressure in a vapor flow passage 16, 70, 76, 92, 110, and 122 coupling the fuel tank 12, vapor-liquid separator 42, refuel control valve 44, and vapor treatment site 26 in fluid communication exceeds a predetermined threshold pressure level. In addition, the safety valve 48 is configured to issue a sonic warning to a refueling attendant during exhaustion to the atmosphere via pipe 94, outlet opening 198, and outer chamber 56 of the fuel vapor discharged from the vapor-liquid separator 42 via the open poppet valve 194. Thus, the safety valve 48 is designed to provide a bypass conduit around the sealed partition 40 to provide a means for discharging fuel vapor to the atmosphere during refueling in the event the refuel control valve 44, actuating linkage 46, or other component is disabled due to malfunction.

In operation, loosening of fuel cap 50 allows control pad 150 to be urged by spring 152, to the right of its position shown in FIG. 4 toward its valve-actuating position shown in FIG. 5. At the same time, control rods 154 pull control ring 156 also to the right causing yoke lever 158 to pivot in a clockwise direction about its pivot axis 168, pushing the distal end of valve stem 126 to the left of its position shown in FIG. 4, thereby causing valve heads 124, 134 to compress springs 136, 138, respectively. Such movement opens valve head 124 permitting fuel vapor to be conducted therethrough to the canister 26 in response to loosening of the fuel cap 50. It is envisioned that fuel cap 50 threadedly engages the filler neck 14 at its mouth 54 so that fuel cap 50 may be loosened simply by rotation. Seal 178 is provided between filler neck cap 14 and fuel cap 50 to seal outer chamber 56 at its outermost end 54 as shown best in FIGS. 4 and 5.

Fuel cap 50 provides suitable means for actuating control pad 150 to vent vapor through the refueling control valve assembly 44 without prematurely breaking the seal provided by seal 178. This seal-maintaining function could be accomplished in a number of different ways. Preferably, fuel cap 50 includes a lost-motion feature so that a control pad-activating grip portion 180 of fuel cap 50 is movable relative to an inner seal-maintaining portion 182 also of the cap 50 during the initial stages of every refueling activity. Thus, the refueling attendant can rotate grip portion 180 a sufficient amount, desirably about one-half of a full turn, to release the outwardly biased control pad 150 without rotating seal-maintaining portion 182, which release could result in prematurely breaking the seal provided by seal 178.

Figure 2:
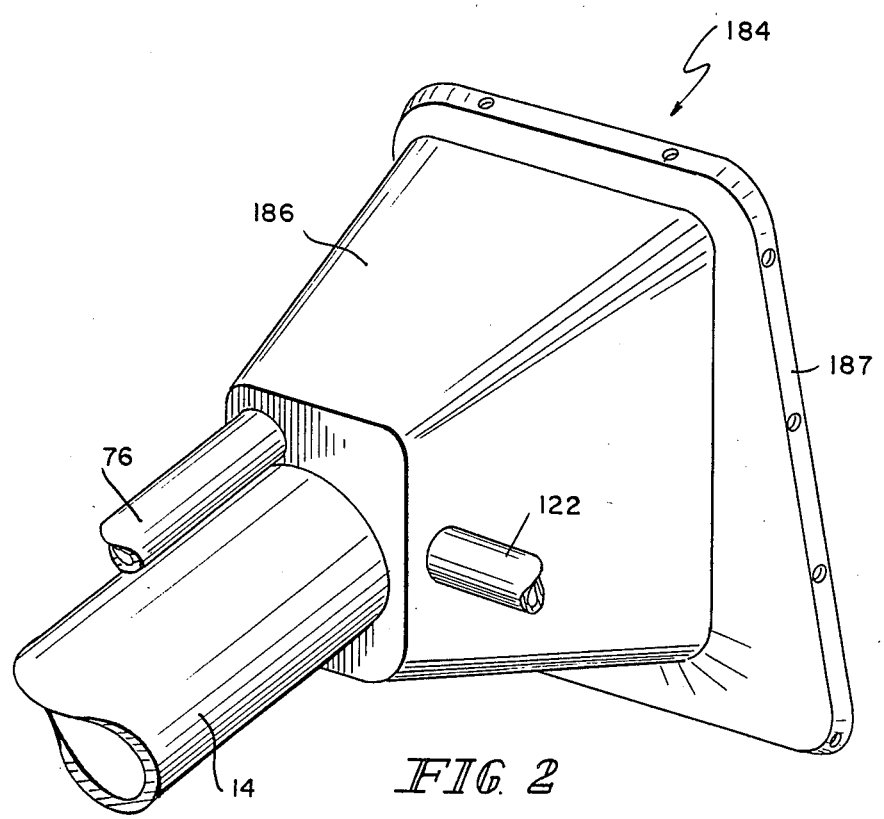
FIG. 2 is a perspective view of an impact shield for use in protecting a portion of the system of the present invention.

Referring to FIGS. 2 and 3, refueling module impact shield 184 is provided for mounting to interior plate 183 within the vehicle interior to protect exposed portions of vapor recovery module 20. The impact shield 184 includes a shield housing 186 provided with peripheral mounting flange 187. The impact shield 184 is formed to include apertures provided with fill, fill-limit, and canister connections and is constructed of a high impact nylon material or the like to protect sensitive components of vapor recovery module 20.

In another embodiment (not shown) of the system shown in FIG. 1, it is contemplated that roll-over valve module 22 be incorporated directly into the structure of the vapor recovery module 20. In one arrangement, this could be accomplished by coupling (not shown) in fluid communication the fuel vapor inlet port of roll-over valve 28 to fuel vapor outlet 86 of vapor-liquid separator 42 instead of being coupled in fluid communication to fuel tank vapor space 24 via vent valve opening 18. It will be appreciated that various components of the roll-over valve module 22 could be included, either individually or in combination, in various locations within the network of the vapor recovery module 20 without departing from the scope of the present invention.

Figure 7:
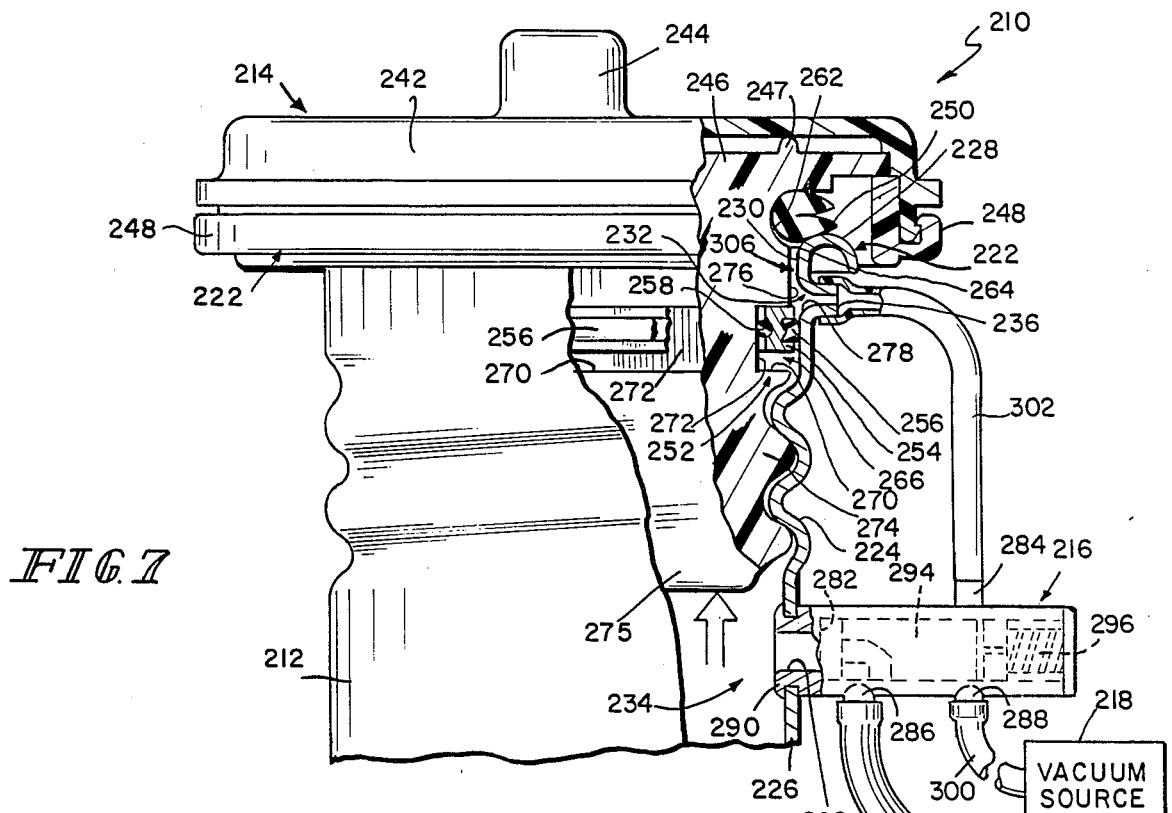
FIG. 7 is a longitudinal sectional view of another embodiment of a vapor recovery module in accordance with the present invention, with portions broken away, showing a fuel cap tightly mounted on a filler neck and a vacuum-controlled valve in its normal position closing a vent outlet provided in the filler neck.
Figure 8:
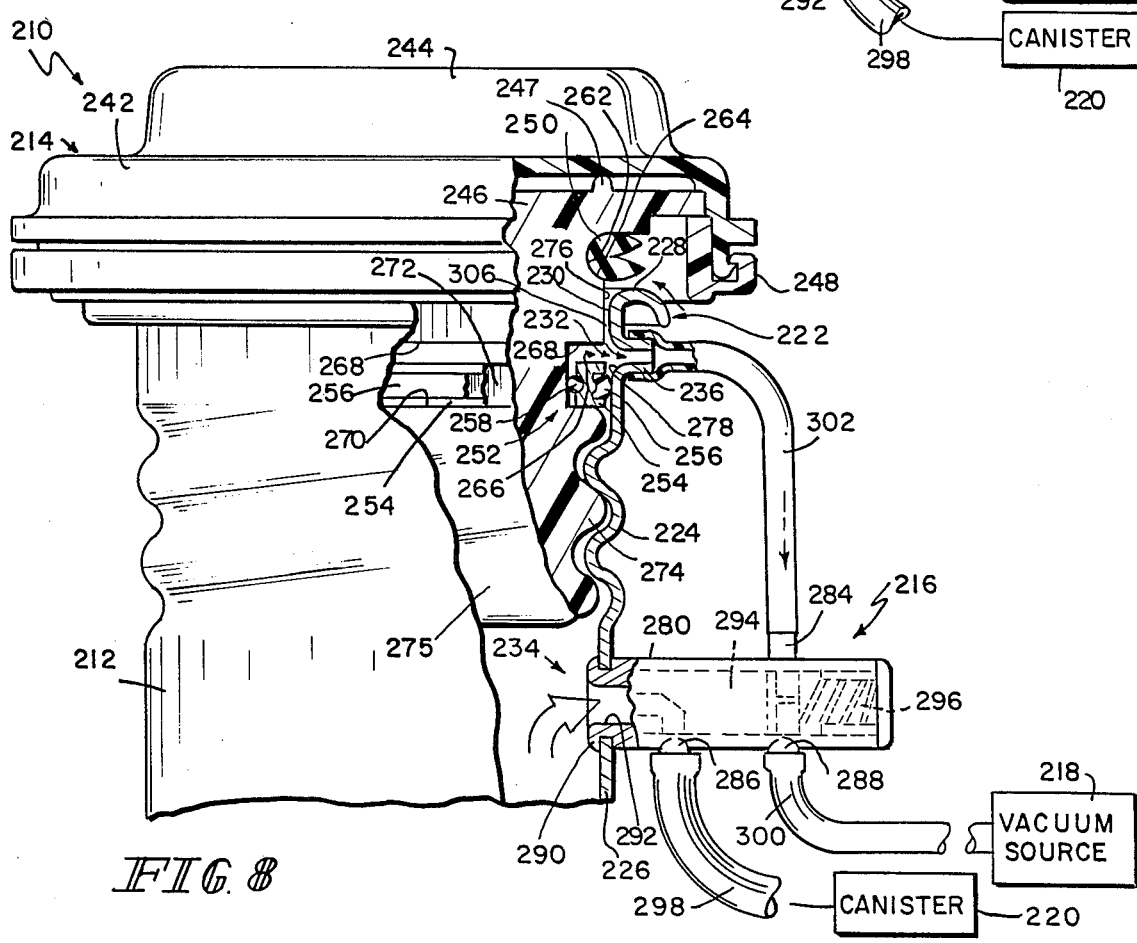
FIG. 8 is a view similar to that of FIG. 7 after rotation of the fuel cap relative to the filler neck to a position breaking an outer seal established therebetween, thereby permitting atmosphere to enter the filler neck and dissipate a vacuum existing in a housing containing the vacuum-controlled valve so that the valve is automatically moved to its vent outlet-opening position.

Another embodiment of vapor recovery module 20 is illustrated in FIGS. 7 and 8. In this embodiment, a filler neck-venting system is provided for detecting partial removal of a fuel cap from its filler neck and automatically activating a vacuum-controlled vent valve to exhaust Pressurized fuel vapor in the filler neck toward a treatment site before sealing engagement between the fuel cap and the filler neck is completely broken. Such a vacuum-controlled system provides an alternative to the mechanical refuel control valve linkage illustrated in FIGS. 1–6.

The fuel vapor recovery system 210 embodied in FIGS. 7 and 8 includes filler neck 212, fuel cap 214, venting module 216, vacuum source 218, and canister 220. Venting module 216 is desirably mounted on one side of the filler neck 212 in a location adjacent the filler neck mouth and is actuated upon rotation of cap 214 in a cap-removal direction past a predetermined position in the filler neck and prior to removal of the cap 214 from the filler neck 212. At this predetermined position, the cap 214 functions to permit atmosphere to enter the filler neck mouth and reach the venting module 216. Such an influx of air dissipates a vacuum provided in the venting module by the vacuum source 218. Dissipation of this vacuum acts to initiate a venting and fuel vapor recovery activity prior to any discharge of fuel vapor through the filler neck mouth.

Filler neck 212 is configured to mate with venting module 216 as shown in FIGS. 7 and 8. Filler neck 212 includes an axially outer lip portion 222 defining the mouth, an intermediate portion 224, and an axially inner body portion 226 connected to a fuel tank (not shown) or the like. The lip portion 222 is shaped to provide an annular seal-engaging surface 228 and an axially inwardly extending, radially inwardly facing side wall 230. Filler neck 212 is formed to include an upper outlet 232 between the lip portion 222 and the intermediate portion 224 and a lower outlet 234 between the intermediate portion 224 and the body portion 226. Illustratively, the filler neck 212 is also formed to include a conduit-receiving fixture 236 extending radially outwardly from the exterior surface of the neck 212 at the upper outlet 232.

Fuel cap 214 includes a shell 242 having an upstanding handle 244 and a threaded closure member 246 having an upwardly extending stand-off 247 for supporting the shell 242 on the closure member 246. Retaining ring 248 is provided for retaining shell 242 and closure member 246 in coupled relation. Threaded closure member 246 rotatably engages threads provided in the intermediate portion 224 during installation and removal of cap 214.

Fuel cap 214 is provided with a double-sealing system for assisting in actuating venting module 216 during removal of the cap 214 from the filler neck 212. The double-sealing system includes an O-ring gasket 250 of conventional design and a movable seal assembly 252 having an annular ring 254 carrying an outer seal 256 and an inner seal 258. Fuel cap 214 includes a recessed annular groove 262 having a lower lip 264 in a location axially beneath groove 262 in spaced relation for receiving O-ring gasket 250. Fuel cap 214 also includes a recessed annular channel 266 having a top wall 268, a bottom wall 270 spaced apart and parallel to the top wall 268, and an orthogonal annular side wall 272 interconnecting the top and bottom walls 268, 270 for receiving movable seal assembly 252. Fuel cap 214 includes a threaded portion 274 extending from bottom wall 270 to an inner end 275 of fuel cap 214 and a radially outwardly facing side wall 276 extending between the lower lip 264 of the upper annular groove 246 and the top wall 268 of the lower annular channel 266.

Seals 250 and 252 are carried by fuel cap 214 during removal from filler neck 212 and maintained in axially spaced-apart relation by groove 262 and channel 266. Seal 250 is inserted in groove 262 and lifted away from sealing engagement with surface 228 on lip portion 222 by lower lip 264. Seal assembly 252 is inserted into and movable within channel 266 relative to cap 214 from an initial position shown in FIG. 7 to a final position shown in FIG. 8 during rotation of cap 214 in a cap-removal direction. Notwithstanding such axial sliding movement in channel 266, the sealing engagement established by movable seal assembly 262 between cap 214 and filler neck 212 is not broken during removal of cap 214 from neck 212 until after outer seal 256 is moved upward past the outermost edge 278 of intermediate neck portion 224.

Venting module 216 includes a hollow valve housing 280 configured to provide an interior valve chamber 282. The valve housing 280 includes an atmospheric air inlet 284, a fuel vapor discharge outlet 286, and a vacuum outlet 288. One end of valve housing 280 is configured to form a mounting portion 290 for sealingly engaging the filler neck 212. The mounting portion 290 is illustratively formed to include a primary inlet 292 for establishing a fluid passage between filler neck 212 and valve chamber 282 of valve housing 280 at the lower outlet 234 in filler neck 212.

A valve assembly for controlling the flow of fuel and pressurized fuel vapor through the primary inlet 292 is diagrammatically illustrated in FIGS. 7 and 8. The valve assembly is shown to include a vacuum-controlled valve 294 and bias means 296 for yieldably moving valve 294 between a closed position shown in FIG. 7 blocking inlet 292 and an open position shown in FIG. 8 opening inlet 292. In its open position, valve 294 permits fuel and pressurized fuel vapor in filler neck 212 to flow toward fuel recovery canister 220 via inlet 292, valve chamber 282, fuel vapor discharge outlet 286, and discharge conduit 298 which is connected to canister 220.

Vacuum source 218 is coupled by vacuum conduit 300 to vacuum outlet 288 so that a vacuum can normally be applied to valve chamber 282 whenever the fuel cap 214 is mounted on filler neck 212 as shown in FIG. 7. Vacuum-controlled valve 294 is configured to move against bias means 296 to its closed position as long as a vacuum exists in valve chamber 282. Conduit 302 interconnects upper outlet 232 of filler neck 212 and atmospheric air inlet 284 of valve housing 280 in fluid communication and, as such, assists in breaking a vacuum existing in valve chamber 282 upon rotation of fuel cap 214 in a cap-removal direction. Dissipation of such a vacuum acts to initiate a fuel vapor recovery sequence in the manner described below to actuate normally closed vacuum-controlled valve 294.

Figure 9:
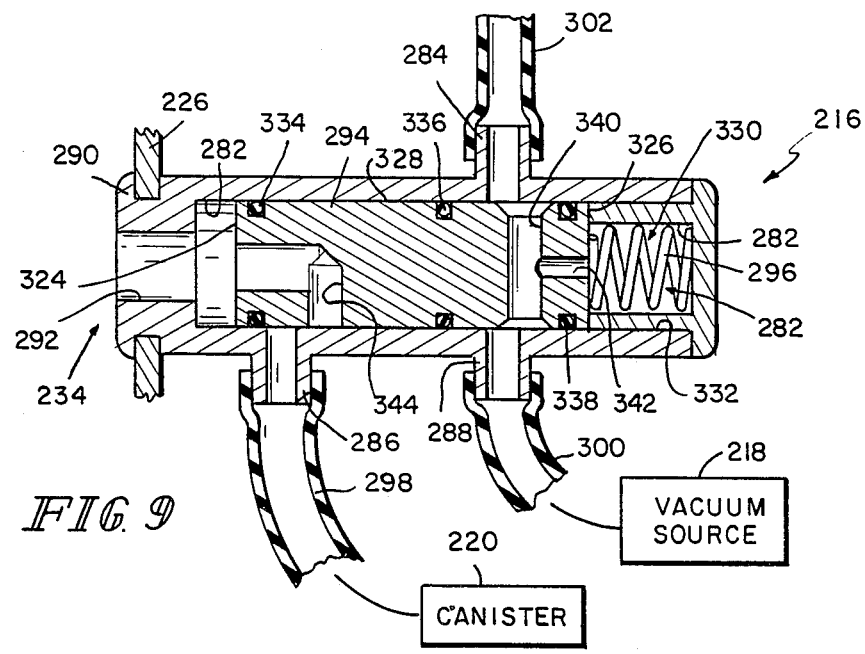
FIG. 9 is a sectional view of the valve illustrated in FIGS. 7 and 9, with portions broken away, showing the position of fluid and negative pressure passageways provided within the valve when the valve is retained by vacuum in its flow delivery-blocking retracted position.
Figure 10:
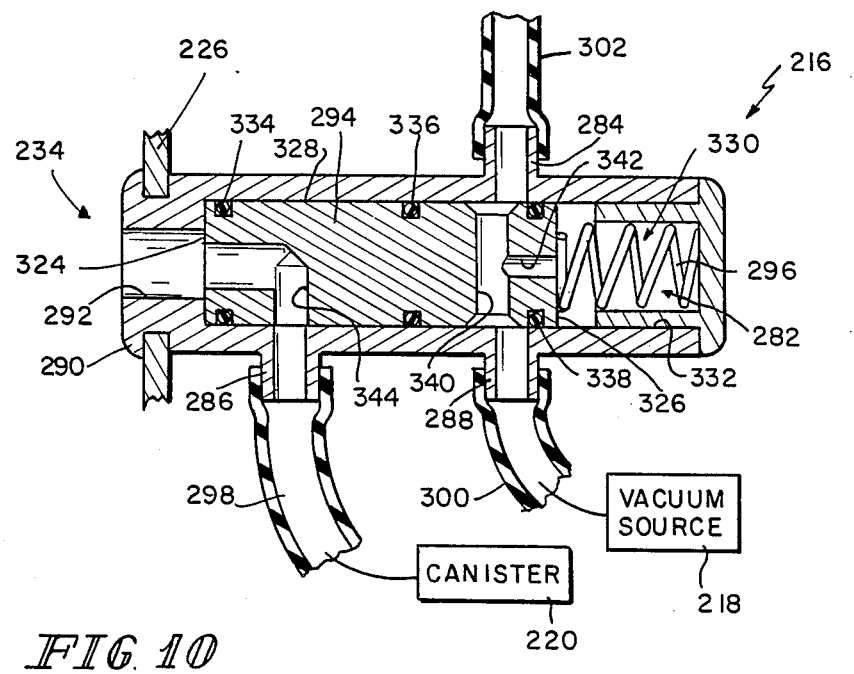
FIG. 10 is a view similar to FIG. 9 showing the position of the valve passageways when the valve is projected by the spring to its normal flow-delivering position.

One embodiment of venting module 216 including a suitable valve assembly for controlling flow from filler neck 212 to canister 220 through primary inlet 292 is schematically illustrated in FIGS. 9 and 10. A valve 294 is slidably received in valve chamber 282 and movable between a retracted position shown in FIG. 9 and a projected position shown in FIG. 10. A spring 296 is provided in valve chamber 282 for yieldably biasing valve 294 toward its projected position.

Valve 294 is formed to include a plurality of interior passageways situated to interconnect selected pairs of vacuum, canister, tank, or filler neck conduits as a function of the position of valve 294 in valve chamber 282 to control the operation of the venting system via the venting module 216. These passageways operate in the manner described below to connect the filler neck 212 to the canister 220 in a projected position of valve 294 and permanently connect the upper outlet 232 near the filler neck mouth with the vacuum source 218 regardless of the position of valve 294.

Valve 294 includes forward and rearward end walls 324, 326 and a side wall 328 extending therebetween. Forward end wall 324 is presented toward filler neck 212 and communicates with lower outlet 234. Rearward end wall 326 is presented toward spring 296 and communicates with an enclosed space 330 provided between valve 294 and interior walls of valve housing 280. Side wall 328 slidably engages interior side wall 332 of valve housing 280 and includes grooves for receiving annular sealing rings 334, 336, and 338. Each of these rings sealingly engage interior side wall 332 as shown in FIGS. 9 and 10.

Passageway 340 is formed in a rearward portion of valve 294 and configured to interconnect air conduit 302 and vacuum conduit 300 whether valve 294 is in its retracted position as shown in FIG. 9 or its projected position as shown in FIG. 10. Negative pressure created by vacuum source 218 is provided in the filler neck region 306 in proximity to upper outlet 232 as a result of the vacuum connection provided by upper outlet 232, air conduit 302, atmospheric air inlet 284, passageway 340, vacuum outlet 288, and vacuum conduit 300. This negative pressure will exist as long as fuel cap 214 is sealingly mounted on filler neck 212.

Passageway 342 is formed in the rearward portion of valve 294 to interconnect passageway 340 and space 330 in valve housing 280 as shown in FIGS. 9 and 10. This passageway 342 communicates any negative pressure in passageway 340 to space 330. Sufficient negative pressure in space 330 acts to move valve 320 against spring 296 from its normal projected position illustrated in FIG. 10 to its retracted position illustrated in FIG. 9. It will be understood that valve 294 will automatically return to its projected position under a force applied by spring 296 upon loosening of cap 214 to expose air conduit 302 to atmospheric pressure, thereby substantially lowering the negative pressure in passageways 340, 342 as well as in space 330.

Passageway 344 is formed in a forward portion of valve 294 to interconnect lower outlet 234 and discharge conduit 298 whenever valve 294 is in its projected position as shown in FIG. 10. Thus, passageway 344 provides means for conducting fuel vapor through venting module 216 from filler neck 212 to canister 220 whenever fuel cap 214 is sufficiently loosened to dissipate the vacuum in space 330 of valve housing 280, which vacuum otherwise acts to retain valve 294 in its retracted position blocking communication between passageway 344 and discharge conduit 298. It will be understood that annular seals 334, 336, and 338 operate to prevent unwanted fluid and/or pressure communication between lower outlet 234, discharge conduit 298, vacuum conduit 300, space 330, and air conduit 302.

It will be further understood that many different arrangements of passageways and sealing rings in valve 294 could provide suitable alternatives to the design illustrated in FIGS. 9 and 10 without departing from the scope of the present invention. In fact, other valve configurations and spring locations are also contemplated.

In operation, the double seal system 250, 252 of fuel cap 214 cooperates with the venting module 216 to recover fuel vapor normally discharged from a fuel system during refueling. Initially, a vacuum is applied to the vacuum-controlled valve 294 by vacuum source 218 to retain valve 294 in its closed position. Pressurized fuel vapor is generally retained in sealed filler neck 212 by seals 250, 252 in cooperation with sealed valve 294. However, it is within the scope of the present invention to install a conventional pressure-vacuum valve assembly (not shown) in cap 214 to provide additional means for controlling pressure conditions in the filler neck 212 and fuel system generally.

In operation, O-ring gasket 250 separates from sealing engagement with surface 228 of filler neck lip portion 222 in response to a predetermined amount of rotation of closure member 246 relative to filler neck 212 in a cap-removal direction. While the axially outermost seal normally provided O-ring 250 has now been broken, the seal provided by axially innermost seal assembly 252 remains intact. Thus, sealing engagement is maintained even though the seal assembly 252 has moved axially outwardly toward the upper outlet 232. Once the seal established by O-ring 250 has been broken, atmosphere will be drawn into a passageway 306 formed between side wall 276 of closure member 246 and side wall 230 of filler neck 212 due to vacuum conditions existing in valve housing 280. The vacuum acts to draw the atmosphere into valve housing 280 along a fluid path provided by passageway 306, upper outlet 232, fixture 236, air conduit 302, and atmospheric air inlet 284.

Exposure of vacuum-controlled valve 294 to atmosphere drawn past O-ring seal 250 into the filler neck 212 and valve housing 280 dissipates the vacuum applied by vacuum source 218 without necessarily deactivating the source 218 itself. Such exposure to ambient conditions actuates the venting module 216 by causing vacuum-controlled valve 294 to move to its open, projected position illustrated in FIGS. 8 and 10. This valve movement permits pressurized fuel vapor to be vented from filler neck 212 and move into valve housing 280 through lower outlet 234 and passageway 344 for subsequent delivery to canister 220 via discharge conduit 298. Such venting occurs without discharging the pressurized fuel vapor in the filler neck through the filler neck mouth in an untreated polluting condition. Thus, the fuel tank remains sealed due to sealing engagement of seal assembly 252 and filler neck 212 during venting activity.

Upon completion of venting operations, continued rotation of cap 214 in a cap-removal direction causes the movable seal assembly 252 to move in an axially outward direction toward the mouth of filler neck 212. Advantageously, a minimal amount of fuel vapor will exit the filler neck mouth upon breaking the seal established by seal assembly 252 since substantially all of the pressurized fuel vapor in filler neck 212 will already have been conducted by venting module 216 to the canister 220 for recovery.

The recovery system of FIGS. 7 and 8 features a novel vacuum dissipation means for actuating a vent valve 294 upon rotation of cap 214 relative to filler neck 212 to a position breaking the seal established by O-ring 250 and prior to removal of cap 214 from the filler neck 212. Even though the seal established by O-ring 250 has been broken, the seal established by movable seal assembly 252 remains intact to provide an influx of air to actuate the venting module 216. Advantageously, this feature permits pressurized fuel vapor in the filler neck 212 to be automatically recovered each time the fuel cap 214 is removed so that such fuel vapor is not discharged into the atmosphere as air pollution.

Although the invention has been described in detail with reference to certain preferred embodiments, variations and modifications exist within the scope and spirit of the invention as described and as defined in the following claims.

What is claimed is:

1. A recovery system for recovering fuel vapor normally discharged from a fuel system during refueling, the recovery system comprising a fuel tank filler neck having a mouth and a vent outlet spaced in relation to the mouth, a fuel cap including closure means rotatably engaging the filler neck for closing the mouth, the closure means including first seal means for normally establishing a seal between the closure means and the filler neck, vent means for selectively venting pressurized fuel vapor from the filler neck through the vent outlet, and actuation means for actuating the vent means upon rotation of the cap relative to the filler neck to a position breaking said seal and prior to removal of the cap from the filler neck to vent pressurized fuel vapor in the filler neck through the vent outlet without venting pressurized fuel vapor through the filler neck mouth.

2. The recovery system of claim 1, wherein the actuation means includes second seal means for normally establishing a seal between the closure means and the filler neck to block the flow of fuel and fuel vapor through the mouth to the atmosphere so that pressurized fuel vapor vents through the vent outlet without venting through the mouth upon actuation of the vent means.

3. The recovery system of claim 2, wherein the actuation means is responsive to rotation of the closure means through an angle relative to the filler neck sufficient to break only the seal established by the first seal means.

4. The recovery system of claim 1, wherein the vent means includes a housing, a valve movable in the housing and having vent outlet-opening and vent outlet-closing positions, and bias means for yieldably moving the valve to its vent outlet-opening position in the absence of a vacuum in the valve housing, and the actuation means includes vacuum means for applying a vacuum to the valve housing to move the valve against the bias means so that the valve is normally retained in its vent outlet-closing position.

5. The recovery system of claim 4, wherein the filler neck is also formed to include an air suction outlet situated between the mouth and the vent outlet, the actuation means further includes second seal means for normally establishing a seal between the closure means and the filler neck in a location intermediate the air suction outlet and the vent outlet and vacuum disabling means for coupling the air suction outlet and the valve housing in fluid communication to permit atmosphere to be admitted into the valve housing via the filler neck and the air suction outlet by the vacuum means upon breaking the seal established by the first seal means to eliminate the vacuum normally established in the valve housing by the vacuum means, thereby permitting the valve to move to its vent outlet-opening position so that pressurized fuel vapor retained in the filler neck by the second seal means is vented through the vent outlet.

6. The recovery system of claim 1, wherein the filler neck is formed to include an air-suction outlet situated between the mouth and the vent outlet, the actuation means includes second seal means for normally establishing a seal between the closure means and the filler neck, and the first and second seal means are situated in axially spaced-apart relation on the closure means so that rotation of the closure means relative to the filler neck breaks the first seal to permit atmosphere to be admitted into the air suction outlet via the mouth and a passageway situated between the closure means and the filler neck prior to breaking the seal established by the second seal means.

7. The recovery system of claim 6, wherein the vent means includes a housing, a vacuum-controlled valve movable in the housing and having vent outlet-opening and vent outlet-closing positions, and bias means for yieldably moving the vacuum-controlled valve to its vent outlet-opening position in the absence of a vacuum in the valve housing, and the actuation means further includes vacuum means for applying a vacuum to the valve housing so that the vacuum-controlled valve is normally retained in its vent outlet-closing position and vacuum disabling means for coupling the air suction outlet and the valve housing in fluid communication so that the vacuum existing in the valve housing is dissipated upon breaking the seal established by the first seal means by atmosphere conducted into the valve housing through the vacuum disabling means, thereby permitting the vacuum-controlled valve to move to its vent outlet-opening position so that pressurized fuel vapor is vented from the filler neck through the vent outlet prior to breaking the fuel vapor barrier established by the second seal means.

8. The recovery system of claim 1, wherein the filler neck is formed to include a vent actuation outlet situated between the mouth and the first outlet, the vent means includes a housing coupled in fluid communication to the vent actuation outlet, a valve movable in the housing and having first outlet-opening and first outlet-closing positions, and bias means for yieldably moving the valve to its first outlet-opening position in the absence of a vacuum in the valve housing, and the actuation means includes vacuum means for applying a vacuum to the valve housing to move the valve against the bias means so that the valve is normally retained in its first outlet-closing position and control means on the closure means for selectively moving the first seal means away from the lip of the filler neck to break the first seal and introduce atmosphere into the valve housing via the filler neck mouth and the vent actuation outlet so that the vacuum is eliminated in response to rotation of the closure means, thereby permitting the bias means to move the valve to its first outlet-opening position.

9. A recovery system for recovering fuel vapor normally discharged from a fuel system during refueling, the recovery system comprising
   a fuel tank filler neck having a lip defining a mouth and a first outlet spaced in relation to the mouth,
   a fuel cap including closure means rotatably engaging the filler neck for closing the mouth, first seal means for establishing a first seal between the closure means and the lip of the filler neck, and second seal means for establishing a second seal between the closure means and the filler neck, the first and second seal means cooperating to block the flow of fuel and fuel vapor in the filler neck through the mouth to the atmosphere upon rotation of the closure means in a cap-advancing direction to a tightened, installed position pressing the first seal means against the lip of the filler neck,
   vent means for selectively venting pressurized fuel vapor from the filler neck through the first outlet, and
   actuation means for actuating the vent means to vent pressurized fuel vapor in the filler neck through the first outlet in response to rotation of the closure means in a cap-removal direction through at least a first predetermined angle relative to the filler neck sufficient to separate the first seal means from the lip of the filler neck and break the first seal without separating the second seal means from sealing engagement with the filler neck.

10. The recovery system of claim 9, wherein the filler neck is formed to include a second outlet situated between the mouth and the first outlet, the vent means includes a housing coupled in fluid communication to the second outlet, a valve movable in the housing and having first outlet-opening and first outlet-closing positions, and bias means for yieldably moving the valve to its first outlet-opening position in the absence of a vacuum in the valve housing, and the actuation means includes vacuum means for applying a vacuum to the valve housing to move the valve against the bias means so that the valve is normally retained in its first outlet-closing position and control means on the closure means for selectively moving the first seal means away from the lip of the filler neck to break the first seal and introduce atmosphere into the valve housing via the filler neck mouth and second outlet so that the vacuum is eliminated in response to rotation of the closure means, thereby permitting the bias means to move the valve to its first outlet-opening position.

11. The recovery system of claim 9, wherein the filler neck is formed to include a second outlet situated between the mouth and the first outlet, and the first and second seal means are situated in axially spaced-apart relation on the closure means so that rotation of the closure means through said at least a first predetermined angle breaks the first seal to permit atmosphere to be admitted into the second outlet via the mouth and a passageway provided between the closure means and the filler neck prior to breaking the second seal, thereby maintaining the flow-blocking barrier established by the second seal means to enable pressurized fuel vapor in the filler neck to be vented through the first outlet without discharging into the atmosphere through the filler neck mouth.

12. The recovery system of claim 11, wherein the vent means includes a housing, a vacuum-controlled valve movable in the housing and having first outlet-opening and first outlet-closing positions, and bias means for yieldably moving the valve to its first outlet-opening position in the absence of a vacuum in the housing, the actuation means including vacuum means for applying a vacuum to the valve housing to normally retain the vacuum-control valve in its first outlet-closing position and passageway means for coupling the second outlet and the valve housing in fluid communication so that the vacuum applied to the valve housing is dissipated by atmosphere conducted through the passageway means upon breaking the first seal to permit the vacuum-controlled valve to move to its first outlet-opening position, thereby permitting pressurized fuel vapor retained in the filler neck by the second seal to be vented from the filler neck through the first outlet until the fuel and fuel vapor barrier provided by the second seal is broken.

13. A recovery system for recovering fuel vapor normally discharged from a fuel system during refueling, the recovery system comprising
a fuel tank filler neck having a mouth, axially spaced-apart upper and lower side outlets, an axially outer side wall extending between the mouth and the upper side outlet, and an axially inner side wall extending between the upper and lower side outlets,
a fuel cap including closure means rotatably engaging the filler neck for closing the mouth, first seal means for normally establishing a movable primary seal between the closure means and the axially outer side wall of the filler neck and second seal means for normally establishing a movable secondary seal between the closure means and at least the axially inner side wall of the filler neck, the primary and secondary seals moving in an axially outward direction relative to the filler neck in response to rotation of the fuel cap in a cap-removal direction so that the primary and secondary seals are broken in sequence during removal of the fuel cap from the filler neck, and
vent means for selectively venting pressurized fuel vapor from the filler neck through the lower side outlet in response to rotation of the fuel cap in the cap-removal direction to a position wherein only the first seal is broken so that pressurized fuel vapor is discharged through the lower side outlet without being exhausted to the atmosphere through the filler neck mouth.

14. The recovery system of claim 13, wherein the vent means includes a housing, a vacuum-controlled valve movable in the housing and having a lower side outlet-opening and lower side outlet-closing positions, vacuum means for applying a vacuum to the valve housing to normally retain the valve in its lower side outlet-closing position, bias means for yieldably moving the valve to its lower side outlet-opening position in the absence of a vacuum in the housing, and passageway means for coupling the upper side outlet and the valve housing in fluid communication so that atmosphere introduced into the upper side outlet upon rotation of the fuel cap to break the first seal is conducted into the valve housing to dissipate a vacuum existing therein causing the bias means to move the valve to its lower side outlet-opening position, thereby permitting pressurized fuel vapor to be vented from the filler neck through the lower side outlet.

15. A recovery system for recovering fuel vapor normally discharged from a fuel system during refueling, the recovery system comprising
a neck assembly including a filler neck having a lip portion defining a mouth, an intermediate portion for receiving a threaded fuel cap, and a body portion connecting the intermediate portion to the fuel system, the filler neck being formed to include an upper outlet substantially between the lip and intermediate portions and a lower outlet in the body portion, a housing providing a valve chamber coupled in fluid communication to the lower outlet, the housing being formed to include an atmospheric air inlet, a fuel vapor discharge outlet, and a vacuum outlet, a vacuum-controlled valve movable in the valve chamber between a venting position opening the lower outlet in the filler neck to a blocking position closing the lower outlet in the filler neck, bias means for yieldably moving the vacuum-controlled valve to its venting position in the absence of a vacuum in the valve chamber, vacuum means coupled to the vacuum outlet for applying a vacuum to the valve chamber to normally retain the vacuum-controlled valve in its blocking position, and Passageway means for coupling the upper outlet in the filler neck to the atmospheric air inlet in the valve housing in fluid communication, and
a fuel cap including closure means rotatably engaging the filler neck for closing the mouth, first seal means for normally establishing a movable primary seal between the closure means and the lip portion, and second seal means for normally establishing a movable secondary seal between the closure means and the intermediate portion, the first and second seal means being situated in axially spaced-apart relation on the closure means, and moving in an axially outward direction relative to the filler neck in response to rotation of the fuel cap in a cap-removal direction so that the first seal means separates from the lip portion prior to movement of a second seal means past the upper outlet in the filler neck to a position engaging the lip portion, thereby permitting atmosphere introduced into the upper outlet upon rotation of the fuel cap to break the primary seal to be conducted into the valve chamber via the passageway means to dissipate a vacuum existing therein and causing the bias means to move the vacuum-controlled valve to its venting position so that pressurized fuel vapor trapped in the intermediate and body portions of the filler neck by the secondary seal is discharged from the filler neck through the lower outlet.

16. A method of activating a fuel vapor recovery system coupled to a fuel tank filler neck in response to the removal of a cap from a filler neck, the method comprising the steps of provviding fuel vapor recovery vent means in the filler neck adjacent to but spaced from a mouth of the filler neck, the vent means including valve means responsive to an influx of air for opening the vent, providing a cap having first seal means for sealing the mouth of the filler neck and second seal means for sealing the filler neck between the mouth and the fuel vapor recovery vent means, and opening the first seal means in response to movement of the cap relative to the filler neck in a cap-removal direction while maintaining the second seal means intact to provide an influx of air to actuate the valve means.

* * * * *